US008031584B2

(12) United States Patent
Guthy et al.

(10) Patent No.: US 8,031,584 B2
(45) Date of Patent: Oct. 4, 2011

(54) SUBCHANNEL ALLOCATION APPARATUS

(75) Inventors: Christian Guthy, Munich (DE); Wolfgang Utschick, Ingolstadt (DE); Josef Nossek, Iffeldorf (DE); Guido Dietl, Munich (DE)

(73) Assignee: NTT DoCoMo, Inc., Tokyo (JP)

( * ) Notice: Subject to any disclaimer, the term of this patent is extended or adjusted under 35 U.S.C. 154(b) by 802 days.

(21) Appl. No.: 12/154,551

(22) Filed: May 22, 2008

(65) Prior Publication Data

US 2008/0291851 A1 Nov. 27, 2008

(30) Foreign Application Priority Data

May 23, 2007 (EP) .................................... 07010292

(51) Int. Cl.
*H04J 11/00* (2006.01)
(52) U.S. Cl. ...................................... 370/208
(58) Field of Classification Search ........................ None
See application file for complete search history.

(56) References Cited

U.S. PATENT DOCUMENTS

| 2003/0218973 | A1 | 11/2003 | Oprea et al. | |
|---|---|---|---|---|
| 2004/0176097 | A1 | 9/2004 | Wilson et al. | |
| 2005/0213682 | A1* | 9/2005 | Han et al. | 375/267 |
| 2007/0127593 | A1* | 6/2007 | Lee et al. | 375/299 |

FOREIGN PATENT DOCUMENTS

| JP | 2007-020059 A | 1/2007 |
|---|---|---|
| WO | 2006/112032 A1 | 10/2006 |
| WO | WO-2006/138021 | 12/2006 |

OTHER PUBLICATIONS

Quentin H. Spencer et al., "Zero-Forcing Methods for Downlink Spatial Multiplexing in Multiuser MIMO Channels," IEEE Transactions on Signal Processing, vol. 52, No. 2, pp. 461-471, Feb. 2004.
Max H. M. Costa, "Writing on Dirty Paper," IEEE Transactions on Information Theory, vol. IT-29, No. 3, pp. 439-441, May 1983.
Pedro Tejera et al., "Subchannel Allocation in Multiuser Multiple-Input-Multiple-Output Systems," IEEE Transactions on Information Theory, vol. 52, No. 10, pp. 4721-4733, Oct. 2006.
P.M. Castro et al., "Robust Precoding for Multi-User Miso Systems with Limited-Feedback Channels." Proc. of Int. Symposium on Wireless Personal Multimedia Communications, 2002.

(Continued)

*Primary Examiner* — Raj Jain
(74) *Attorney, Agent, or Firm* — Nutter McClennen & Fish LLP; John J. Penny, V (57) ABSTRACT

Subchannel allocation apparatus for allocating subchannels of a MIMO radio channel to a plurality of users, the MIMO radio channel having a first number of subchannels, each subchannel having a transmission capacity. The subchannel allocation apparatus includes a subspace determiner for determining a subspace of the MIMO radio channel, the subspace having a second number of subchannels, the second number being lower than the first number and each subchannel of the second number of subchannels having a higher transmission capacity than the subchannel with the lowest transmission capacity of the first number of subchannels. The subchannel allocation apparatus further includes a subchannel allocator responsive to the subspace determiner for allocating a subchannel from the second number of subchannels of the subspace to a user based on an allocation metric.

27 Claims, 5 Drawing Sheets

OTHER PUBLICATIONS

Zukang Shen et al., "Low Complexity User Selection Algorithms for Multiuser MIMO Systems With Block Diagonalization," IEEE Transactions on Signal Processing, vol. 54, No. 9, pp. 3658-3663, Sep. 2006.

Kibeom Seong et al., "Optimal Resource Allocation for OFDMA Downlink Systems," Department of Electrical Engineering, Stanford University, ISIT 2006, Seattle, USA, Jul. 9-14, 2006.

Pedro Tejera et al., "Efficient Implementation of Successive Encoding Schemes for the MIMO OFDM Broadcast Channel," Institute for Circuit Theory and Signal Processing, 2006.

Michel T. Ivrlac et al., "Fading Correlations in Wireless MIMO Communication Systems," IEEE Journal on Selected Areas in Communications, vol. 21, No. 5, pp. 819-828, Jun. 2003.

Richard B. Ertel et al., "Overview of Spatial Channel Models for Antenna Array Communication Systems," IEEE Personal Communications, pp. 10-22, Feb. 1998.

Raphael Hunger, "Floating Point Operations in Matrix-Vector Calculus," Version 1.3, Technical Report, Technische Universitat Munchen, Associate Institute for Signal Processing, 2007.

Matthias Stege et al., "MIMO Channel Estimation with Dimension Reduction," Mobile Communications Systems Chair, Dresden University of Technology, Germany, 2002.

Mohammad Ali Maddah-Ali et al., "An Efficient Signaling Scheme for MIMO Broadcast Systems: Design and Performance Evaluation," Department of Electrical & Computer Engineering, University of Waterloo, Technical Report UW-E&CE 2005-9, Jul. 2005.

European Search Report (Dec. 12, 2008).

L.L. Scharf, "Statistical Signal Processing" Addison-Wesley 1990.

Gene H. Golub and Charles F. van Loan "Matrix Computations" The John Hopkins University Press, 1989.

Japanese Office Action issued Aug. 11, 2010 and its English translation.

Manabu Mikami and Teruya Fujii, "A study on multi-cell/multi-user MIMO Transmission with whitening filter at both base and mobile stations", IEICE technical report, Japan, the Institute of Electronics, Information and Communication Engineers, Nov. 17, 2005, vol. 105(430), pp. 103-110 (with English translation of the relevant part).

Yosuke Fujino, Daisei Uchida, Osamu Kagami and Masahiro Umehira, "An effect of adaptive spatial sub-channel allocation for multi-user MIMO System", Proceedings of the IEICE General Conference, Japan, the Institute of Electronics, Information and Communication Engineers, Mar. 7, 2005, vol. 2005—Communication (1), pp. 530 (with English translation of the relevant part).

(BD: Block Diagonalization) Quentin H. Spencer, A. Lee Swindlehurst, Martin Haardt,"Zero-forcing methods for downlink spatial multiplexing in multiuser MIMO channels", Signal Processing, IEEE Transactions on, IEEE, Feb. 2004, vol. 52 Issue: 2, pp. 461-471.

(OFDMA: Orthogonal Frequency Division Multiple Access) Kibeom Seong, Mehdi Mohseni, John M. Cioffi, "Optimal Resource Allocation for OFDMA Downlink Systems", Information Theory, 2006 IEEE International Symposium on, IEEE, Jul. 14, 2006, pp. 1394-1398.

(SESAM: Successive Encoding and Successive Allocation Method) Pedro Tejera, Wolfgang Utschick, Gerhard Bauch, Josef A. Nossek, "Subchannel Allocation in Multiuser Multiple Input Multiple Output Systems", Information Theory, IEEE Transactions on, IEEE, Oct. 2006, vol. 52, Issue 10, pp. 4721-4733.

(DPC: Dirty Paper Cording) Max H. M. Costa, "Writing on Dirty Paper", Information Theory, IEEE Transactions on, IEEE, Mar. 1983, vol. 29, Issue 3, pp. 439-441.

(Measuement of the Channel Energy by Means of the Squared Frobenius Norm of the Channel Matrix) Zukang Shen, Runhua Chen, Jeffrey G. Andrews, Robert W. Heath, Brian L. Evans, "Low complexity user selection algorithms for multiuser MIMO systems with block diagonalization", Signal Processing, IEEE Transactions on, IEEE, Sep. 2006, vol. 54, Issue 9, pp. 3658-3663.

(Summary for Multi-User MIMO) Quentin H. Spencer, Christian B. Peel, A. Lee Swindlehurst, Martin Haardt, "An Introduction to the Multi-User MIMO Downlink", Communications Magazine, IEEE Oct. 2004, vol. 42, Issue 10, pp. 60-67.

Quentin H. Spencer et al., "Zero-Forcing Methods for Downlink Spatial Multiplexing in Multiuser MIMO Channels," IEEE Transactions on Signal Processing, vol. 52, No. 2, pp. 461-471, Feb. 2004.

Christian Guthy et al., "Rate-Invariant User Preselection for Complexity Reduction in Multiuser MIMO Systems.", Sep. 2008.

Max H. M. Costa, "Writing on Dirty Paper," IEEE Transactions on Information Theory, vol. IT-29, No. 3, pp. 439-441, May 1983.

Pedro Tejera et al., "Subchannel Allocation in Multiuser Multiple-Input-Multiple-Output Systems," IEEE Transactions on Information Theory, vol. 52, No. 10, pp. 4721-4733, Oct. 2006.

P.M. Castro et al., "Robust Precoding for Multi-User Miso Systems with Limited-Feedback Channels." Proc. of Int. Symposium on Wireless Personal Multimedia Communications, 2002.

Zukang Shen et al., "Low Complexity User Selection Algorithms for Multiuser MIMO Systems With Block Diagonalization," IEEE Transactions on Signal Processing, vol. 54, No. 9, pp. 3658-3663, Sep. 2006.

Kibeom Seong et al., "Optimal Resource Allocation for OFDMA Downlink Systems," Department of Electrical Engineering, Stanford University, ISIT 2006, Seattle, USA, Jul. 9-14.

Louis L. Scharf et al: "Statistical Signal Processing; Detection, Estimation and Time Series Analysis," University of Colorado at Boulder pp. 43-46, 1991.

Gene H. Golub, et al: "Matrix Computations," Second Edition, The Johns Hopkins University Press, Baltimore and London, pp. 394-395, 1996.

* cited by examiner

SUBCHANNEL ALLOCATION APPARATUS

CROSS-REFERENCE TO RELATED APPLICATIONS

This application claims priority from European Patent Application No. 07010292.6, which was filed on May 23, 2007, and is incorporated herein in its entirety by reference.

TECHNICAL FIELD

The present invention is in the field of multiple-input-multiple-output (MIMO=Multiple-Input-Multiple-Output) communication systems.

BACKGROUND

Present and future communication systems take more and more advantage of the spatial properties of the MIMO radio channel. Such radio channels are established by using multiple antennas at either end of the communication link, for example at a base station and a mobile station.

In a point to multipoint communication system, as for instance the downlink of a mobile communication system, the transmitter has the important task of assigning resources such as time, frequency and space components to the receivers under its coverage. If the transmitter knows the channel of each user, multiple users can be served at the same time and over the same frequency multiplexing them in space. In a multipoint to point communication system, as for example the uplink of a mobile communication system, this task has to be accomplished by the receiver. In the following the analysis will illuminate the downlink, application to the uplink is straightforward. For this purpose multiple antennas at the base station or access point and at the mobile users are employed, which leads to the well-known MIMO systems. Here, a MIMO system with K users with $M_{Tx}$ antennas at the transmitter and $M_{Rx,k}$ antennas at the k-th receiver is considered. The k-th user's channel is described by the matrix $$H_k \in \mathbb{C}^{M_{Rx,k} \times M_{Tx}}.$$

In the literature a lot of algorithms can be found which perform a resource allocation based on instantaneous knowledge of all matrices $H_k$ at the transmitter. To name only a few, there are Block Diagonalization (BD=Block Diagonalization) as described by Q. H. Spencer, A. L. Swindlehurst, and M. Haardt in Zero-forcing Methods for Downlink Spatial Multiplexing in Multiuser MIMO Channels, *IEEE Trans. on Signal Processing*, 52:461-471, 2004, Orthogonal Frequency Division Multiple Access (OFDMA=Orthogonal Frequency Division Multiple Access) as described by K. Seong, M. Mohseni, and J. M. Cioffi in Optimal Resource Allocation for OFDMA Downlink Systems, In *Proc. of International Symposium of Information theory (ISIT)*, 2006 and the Successive Encoding Successive Allocation Method (SESAM=Successive Encoding Successive Allocation Method) as described by P. Tejera, W. Utschick, G. Bauch, and J. A. Nossek in Subchannel Allocation in Multiuser Multiple Input Multiple Output Systems, *IEEE Transactions on Information Theory*, 52:4721-4733, October 2006.

These algorithms necessitate full channel state information (CSI=Channel State Information) at the transmitter. In Time Division Duplex (TDD=Time Division Duplex) systems this necessitates the estimation of $M_{Tx} M_{Rx,k}$ coefficients per channel realization for each user at the transmitter. In Frequency Division Duplex (FDD=Frequency Division Duplex) systems, where unlike in TDD systems, the reciprocity of uplink and downlink cannot be exploited straightforwardly, these complex coefficients need to be fed back from the mobile receivers to the base station. Furthermore the dimensions of the matrices $H_k$ determine the computational complexity of these transmit signal processing algorithms, as they are based on Singular Value Decompositions (SVD=Singular Value Decomposition) of these matrices.

The SESAM algorithm is shortly reviewed here as an exemplified concept. The algorithm works as follows:

First the principal singular value of each user $\sigma_{k,i,1}$ is determined, whereby i denotes the dimension index and the index 1 stands for the principal singular value. Currently i=1.

Afterwards the user with the largest singular value $$\sigma_{\pi(1),1,1} = \max_k \sigma_{k,1,1}$$

is selected for transmission in the first spatial domain. $\pi(i)$ thereby denotes the encoding order function, i.e. $\pi(1)$ refers to the user encoded in dimension 1. The transmit beamforming vector is given by the left singular vector $\upsilon_1$ corresponding to the principal singular value of user $\pi(1)$.

To determine the user in the second dimension first all channels are projected into the null space of $\upsilon_1$, such that the following users do not interfere with user $\pi(1)$. The projected channels $H_{k,2}$ are obtained by the matrix operation $$H_{k,2} = H_k(I_{M_{Tx}} - \upsilon_1 \upsilon_1^H) \quad (1.1)$$

wherein $I_{M_{Tx}}$ denotes the $M_{Tx} \times M_{Tx}$ identity matrix and the second index of the channel matrix constitutes the dimension index.

Note that this operation only guarantees that user $\pi(2)$ does not interfere with user $\pi(1)$. Interference from user $\pi(1)$ to user $\pi(2)$ is canceled by means of Dirty Paper Coding (DPC) as described by Max H. M. Costa, Writing on Dirty Paper, *IEEE Transactions on Information Theory*, 29:439-441, May 1983. User selection is now performed with the projected channels and the user with the maximum projected singular value is chosen for transmission. The corresponding transmit vector $\upsilon_2$ is the principal right singular vector of the projected channel matrix $H_{\pi(2),2}$. The process is continued by further projecting the matrices $H_{k,2}$ into the nullspace of $\upsilon_2$ and selecting the user for the next spatial dimension until no spatial dimension is left. By this procedure up to $M_{Tx}$ scalar sub channels are generated. As on each sub channel no interference occurs, the optimum power allocation is determined by water filling over the sub channels. The SESAM algorithm can be easily extended to *Orthogonal Frequency Division Multiplexing* (OFDM=Orthogonal Frequency Division Multiplexing) systems by decomposing the MIMO channels into scalar sub channels on each sub carrier separately as described above and performing water filling over the sub channels of all carriers.

SUMMARY

An embodiment may have a subchannel allocation apparatus for allocating subchannels of a MIMO radio channel to a plurality of users, the MIMO radio channel having a first number of subchannels, each subchannel having a transmission capacity. The subchannel allocation apparatus comprises a subspace determiner for determining a subspace of the MIMO radio channel, the subspace having a second number of subchannels, the second number being lower than the first number and each subchannel of the second number of subchannels having a higher transmission capacity than the subchannel with the lowest transmission capacity of the first number of subchannels. The subchannel allocation apparatus further comprises a subchannel allocator responsive to the subspace determiner for allocating a subchannel from the second number of subchannels of the subspace to a user based on an allocation metric.

A further embodiment may have a transceiver apparatus comprising a subchannel allocation apparatus for allocating subchannels of a MIMO radio channel to a plurality of users, the MIMO radio channel comprising a first number of subchannels, a subchannel comprising a transmission capacity, the subchannel allocation apparatus comprising: a subspace determiner for determining a subspace of the MIMO radio channel, the subspace comprising a second number of subchannels, the second number being lower than the first number and each subchannel of the second number of subchannels comprising a higher transmission capacity than the subchannel with the lowest transmission capacity of the first number of subchannels; and a subchannel allocator responsive to the subspace determiner for allocating a subchannel from the second number of subchannels of the subspace to a user based on an allocation metric.

According to another embodiment, a method for allocating subchannels of a MIMO radio channel to a plurality of users, the MIMO radio channel comprising a first number of subchannels, each subchannel comprising a transmission capacity, may have the steps of: determining a subspace of the MIMO radio channel, the subspace comprising a second number of subchannels, the second number being lower than the first number and each subchannel of the second number of subchannels comprising a higher transmission capacity than the subchannel with the lowest transmission capacity of the first number of subchannels; and allocating a subchannel from the second number of subchannels of the subspace to a user based on an allocation metric in response to determining the subspace.

A further embodiment may have a computer program comprising a program code for performing a method for allocating subchannels of a MIMO radio channel to a plurality of users, the MIMO radio channel comprising a first number of subchannels, each subchannel comprising a transmission capacity, the method comprising: determining a subspace of the MIMO radio channel, the subspace comprising a second number of subchannels, the second number being lower than the first number and each subchannel of the second number of subchannels comprising a higher transmission capacity than the subchannel with the lowest transmission capacity of the first number of subchannels; and allocating a subchannel from the second number of subchannels of the subspace to a user based on an allocation metric in response to determining the subspace, when the program code runs on a computer.

Another embodiment may have a transceiver apparatus for communicating in a MIMO radio channel, the MIMO radio channel having a first number of subchannels, each subchannel having a transmission capacity. The transceiver apparatus comprises a channel estimator for estimating the MIMO radio channel based on pilot symbols provided by a transmitter. The transceiver apparatus further comprises a channel evaluator for determining the first number of subchannels based on the estimated MIMO radio channels. Furthermore, the transceiver apparatus comprises a subspace determiner for determining a subspace of the MIMO channel, the subspace having a second number of subchannels, the second number being lower than the first number and each subchannel of the second number of subchannels having a higher transmission capacity than the subchannel with the lowest transmission capacity of the first number of subchannels. The transceiver apparatus further comprises a feedback transmitter for transmitting information on the subspace.

According to another embodiment, a method for communicating in a MIMO radio channel, the MIMO radio channel comprising a first number of subchannels, each subchannel comprising a transmission capacity, may have the steps of: estimating the MIMO radio channel based on pilot symbols provided by a transmitter; determining the first number of subchannels based on the estimated MIMO radio channel; determining a subspace of the MIMO radio channel, the subspace comprising a second number of subchannels, the second number being lower than the first number and each subchannel of the second number of subchannels comprising a higher transmission capacity than the subchannel with the lowest transmission capacity of the first number of subchannels; and transmitting information on the subspace.

Another embodiment may have a computer program comprising a program code for performing a method for communicating in a MIMO radio channel, the MIMO radio channel comprising a first number of subchannels, each subchannel comprising a transmission capacity, the method comprising: estimating the MIMO radio channel based on pilot symbols provided by a transmitter; determining the first number of subchannels based on the estimated MIMO radio channel; determining a subspace of the MIMO radio channel, the subspace comprising a second number of subchannels, the second number being lower than the first number and each subchannel of the second number of subchannels comprising a higher transmission capacity than the subchannel with the lowest transmission capacity of the first number of subchannels; and transmitting information on the subspace, when the computer program runs on a computer.

The present invention is based on the finding that the complexity of subchannel allocation can be significantly reduced, when subchannel allocation is based on a subspace of the MIMO channel, the subspace having a lower number of subchannels, however, conserving a significant amount of the channel's energy and total transmission capacity. Provided that subchannel allocation is done in a subspace, feedback provided by a receiver, as for example in an FDD system can be adapted to the subspace and accordingly a lower amount of feedback information is needed. Moreover, having the knowledge that only a subspace is utilized, signal processing complexity at a transmitter can be further reduced, when for example, carrying out a subchannel allocation scheme, as for example SESAM (SESAM=Successive Encoding Successive Allocation Method).

Embodiments therefore comprise a method for complexity reduction in multi-user MIMO systems, using for example the SESAM algorithm. The computationally most expensive part in the SESAM algorithm are the singular value decompositions, which have to be performed in each step of the transmit signal generation for each user. Embodiments reduce this computational burden by approximating the channel matrix in a subspace of reduced dimension, thus, significantly decreasing the dimension and therefore computational complexity of the necessitated singular value decompositions.

In embodiments subspaces can be chosen such that the remaining average or instantaneous channel energy in the approximation is maximized. Despite the immense reduction in computational complexity of up to 88% in terms of the number of floating point operation for a MIMO system based on the Gaussian-Wide-Sense-Stationary-Uncorrelated-Scattering (GWSSUS=Gaussian-Wide-Sense-Stationary-Uncorrelated-Scattering) channel model, embodiments utilize only a low performance degradation, which is still acceptable.

Since only the approximate channel matrices need to be fed back from the receivers to the transmitter, the amount of feedback information may also be reduced by embodiments.

Some embodiments utilize the SESAM algorithm, which allows significant gains in terms of cell throughput. However, the computational complexity of the original algorithm is relatively high. Embodiments allow significant complexity reduction with an acceptable degradation in performance. Therefore, embodiments save computational power and reduce processing delay. Moreover, the proposed embodiments decrease the amount of necessitated channel state information at the transmitter, thus, reducing the needed transmission rate of the feedback channels between the receivers and transmitters.

BRIEF DESCRIPTION OF THE DRAWINGS

Embodiments of the present invention will be detailed subsequently referring to the appended drawings, in which.

DETAILED DESCRIPTION

Figure 1A:
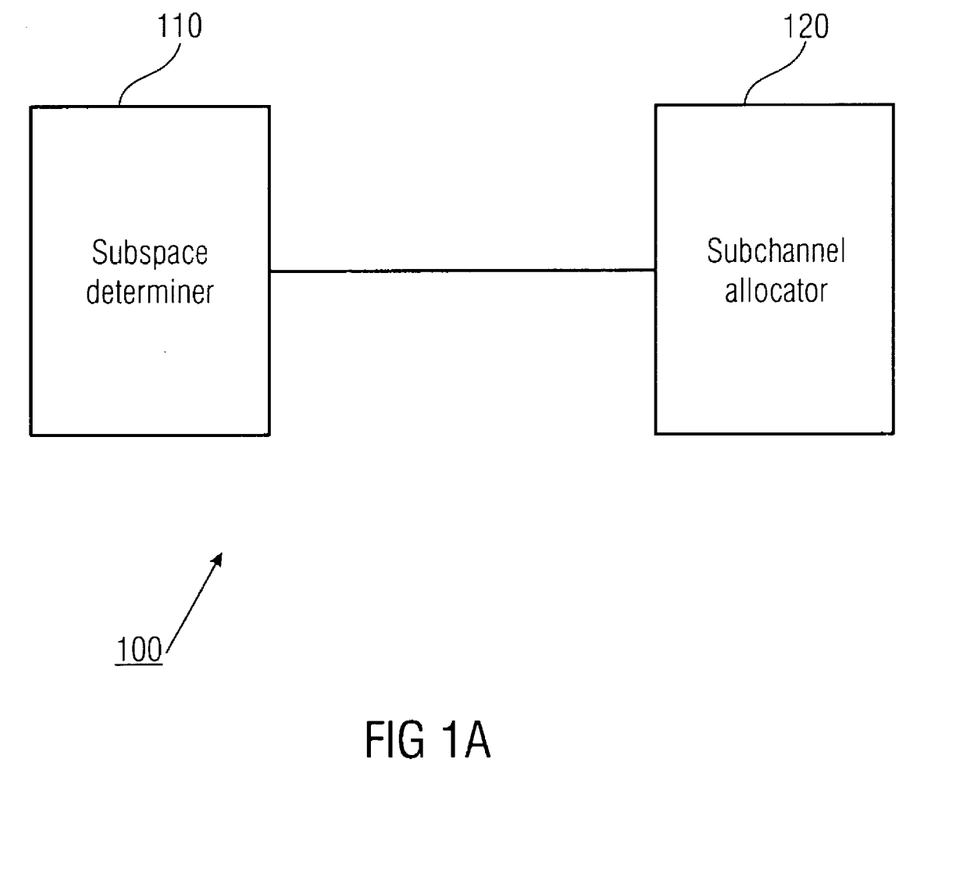
FIG. 1a is an embodiment of a subchannel allocation apparatus.

FIG. 1a shows a subchannel allocation apparatus 100 for allocating subchannels of a MIMO radio channel to a plurality of users, the MIMO radio channel having a first number of subchannels, each subchannel having a transmission capacity. The subchannel allocation apparatus 100 comprises a subspace determiner 110 for determining a subspace of the MIMO radio channel, the subspace having a second number of subchannels, the second number being lower than the first number and each subchannel of the second number of subchannels having a higher transmission capacity than the subchannel with the lowest transmission capacity of the first number of subchannels. The subchannel allocation apparatus further comprises a subchannel allocator 120, which is responsive to the subspace determiner 110 for allocating a subchannel from the second number of subchannels of the subspace to a user based on an allocation metric.

Embodiments may determine the transmission capacity of a subchannel by one of or a combination of a group of singular values, an SNR (SNR=Signal-to-Noise-Ratio), an SINR (SINR=Signal-to-Noise-and-Interference-Ratio). Instead a data rate, a necessitated transmit power, an outage capacity or a lowest error rate as e.g. a bit-error-rate can be used as transmission capacity. The transmission capacity may be an average capacity as for instance determined by an eigenvalue analysis of a covariance matrix, an eigenvalue may correspondingly relate to a transmission capacity or an average transmission capacity.

In embodiments, the subspace determiner 110 can be adapted for determining the subspace based on an information received from a user. The subspace determiner 110 can be further adapted for determining the subspace based on a channel estimation information from a user or a channel estimator being comprised in the subchannel allocation apparatus 100. Especially for embodiments in FDD communications systems, a receiver or a user, to which a subchannel is to be allocated to, can provide feedback information in terms of channel estimation information. In a TDD environment, embodiments may utilize a channel estimator being co-located with the subchannel allocation apparatus 100, taking advantage of the reciprocity of the mobile radio channel.

In embodiments, the subspace determiner 110 can be adapted for using an information on a reduced MIMO channel matrix being associated with a channel matrix of the MIMO radio channel for mapping the reduced MIMO channel matrix to the subspace of the MIMO radio channel utilizing a projection matrix, the reduced MIMO channel matrix having a lower rank or dimension than the associated channel matrix of the MIMO radio channel.

In embodiments, the projection matrix can be based on eigenvectors of a covariance matrix of the associated channel matrix of the MIMO radio channel corresponding to eigenvalues, which are higher than the lowest eigenvalue of the covariance matrix of the associated channel matrix of the MIMO radio channel, wherein the transmission capacity of a subchannel can correspond to an average transmission capacity, which can be derived from the respective eigenvalue.

In other embodiments, the projection matrix can be based on singular vectors of the associated channel matrix of the MIMO radio channel corresponding to singular values, which are higher than the lowest singular value of the associated channel matrix of the MIMO radio channel, wherein the transmission capacity of a subchannel can be derived from the respective singular value.

Embodiments may use a subchannel allocator 120, which is adapted for determining singular values of a subspace matrix as allocation metric with corresponding right singular vectors, determining the second number of subchannels of the subspace of the MIMO radio channel and for allocating a subchannel to the user corresponding to a higher singular value than the lowest singular value of the subspace matrices of the plurality of users.

In embodiments, the subchannel allocator 120 can be adapted for determining the singular values of the subspace based on an eigenvalue decomposition or a singular value decomposition of a reduced MIMO channel matrix being associated with a channel matrix of the MIMO radio channel and a projection matrix, the reduced MIMO channel matrix having a lower rank or dimension than the associated channel matrix of the MIMO radio channel. The rank or dimension of the reduced MIMO channel matrix may be based on the second number of subchannels in the subspace of the MIMO radio channel. In embodiments the reduced MIMO channel matrix may be a square matrix having as many entries in a row or column as the second number of subchannels in the subspace.

In embodiments, the subchannel allocator 120 may be adapted for allocating a plurality of subchannels to the plurality of users according to an allocation algorithm based on a SVD, SESAM, BD or OFDMA, based on the subspace of the MIMO radio channel. The subchannel allocator 120 can be adapted for determining iteration subspaces of the SESAM algorithm based on reduced iteration MIMO channel matrices having a rank or dimension being based on a number of allocation channels, wherein the number of allocation subchannels is lower than or equal to the second number of subchannels.

Other embodiments are transceiver apparatuses comprising subchannel allocation apparatuses 100 according to the above description. Such embodiments of transceiver apparatuses may be adapted for communicating in an FDD or TDD communication system. Furthermore, they may be adapted for communicating in an OFDM (OFDM=Orthogonal Frequency Division Multiplex) or CDM (CDM=Code Division Multiplex) system.

Figure 1B:
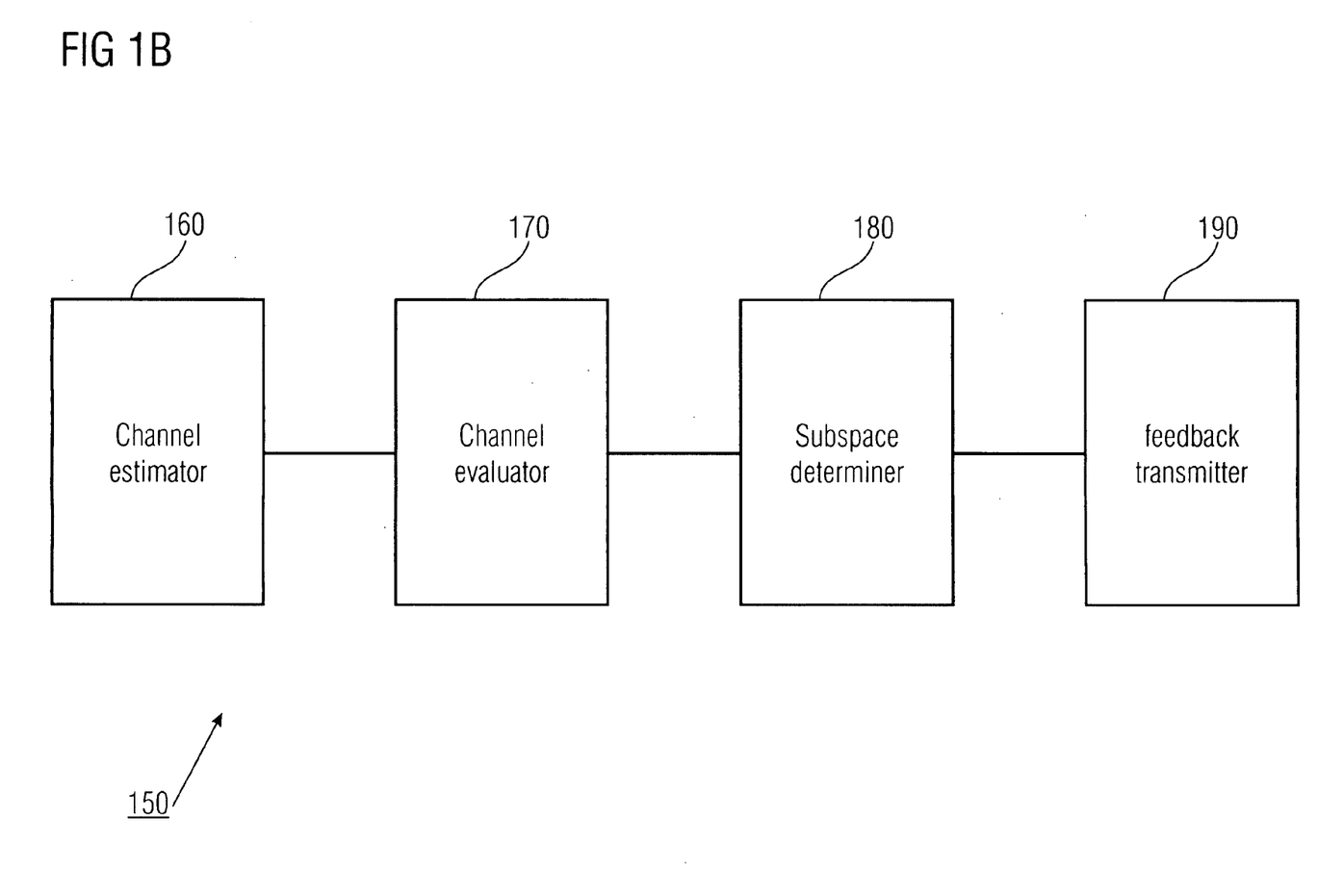
FIG. 1b is an embodiment of a transceiver apparatus.

FIG. 1b shows an embodiment of a transceiver apparatus 150 for communicating in a MIMO radio channel, the MIMO radio channel having a first number of subchannels, each subchannel having a transmission capacity. The transceiver apparatus 150 comprises a channel estimator 160 for estimating the MIMO radio channel based on pilot symbols provided by a transmitter and further comprises a channel evaluator 170 for determining the first number of subchannels based on the estimated MIMO radio channel. The transceiver apparatus 150 further comprises a subspace determiner 180 for determining a subspace of the MIMO radio channel, the subspace having a second number of subchannels, the second number being lower than the first number and each subchannel of the second number of subchannels having a higher transmission capacity than the subchannel with the lowest transmission capacity of the first number of subchannels. The transceiver apparatus 150 further comprises a feedback transmitter 190 for transmitting information on the subspace.

Embodiments may determine the transmission capacity of a subchannel by one of or a combination of a group of singular values, an SNR (SNR=Signal-to-Noise-Ratio), an SINR (SINR=Signal-to-Noise-and-Interference-Ratio). Instead a data rate, a necessitated transmit power, an outage capacity or a lowest error rate as e.g. a bit-error-rate can be used as transmission capacity. The transmission capacity may be an average capacity as for instance determined by an eigenvalue analysis of a covariance matrix, an eigenvalue may correspondingly relate to a transmission capacity or an average transmission capacity.

In further embodiments, the subspace determiner 180 may be adapted for determining an information on a reduced MIMO channel matrix being associated with the channel matrix of the MIMO radio channel and a projection matrix for mapping the reduced MIMO channel matrix to the subspace of the MIMO radio channel, the reduced MIMO channel matrix having a lower rank or dimension than the associated channel matrix of the MIMO radio channel.

The projection matrix can be based on eigenvectors of a covariance matrix of the associated channel matrix of the MIMO radio channel corresponding to eigenvalues, which are higher than the lowest eigenvalue of a covariance matrix of the associated channel matrix of the MIMO radio channel, wherein the transmission capacity of a subchannel can correspond to an average transmission capacity, which can be derived from the respective eigenvalue.

The projection matrix can also be based on singular vectors of the associated channel matrix of the MIMO radio channel corresponding to singular values, which are higher than the lowest singular value of the associated channel matrix of the MIMO radio channel, wherein the transmission capacity of a subchannel can be derived from the respective singular value.

The rank or dimension of the reduced MIMO channel matrix can be based on the second number of subchannels of the subspace of the MIMO channel. In embodiments the reduced MIMO channel matrix may be a square matrix having the second number of rows and columns. The second number may be a predefined value. In embodiments, the second number may be a pre-configured value, as for example a fixed setting in a communication system, for example using two or three subchannels out of an 8×4 MIMO radio channel. According to what was stated above, the transceiver apparatus 150 can be adapted for communicating in an FDD or TDD communication system. Moreover, it may be adapted for communicating in an OFDM or CDM system.

In order to reduce the amount of needed channel information and the computational complexity at the transmitter without reducing the number of transmit and receive antennas embodiments may work in predefined subspaces which are chosen such that most of the channels' energy is captured. Hence the users' channels are projected into subspaces and signal processing at the base station or access point is conducted in these subspaces whereas these projected channels are used as the perfect channel state information for signal processing.

Embodiments of the present invention can therefore apply a concept of reduced subspaces to signal processing algorithms, which utilize a singular value decomposition of projected channel matrices for the purpose of complexity reduction. Embodiments therewith achieve a reduction in computational complexity for these algorithms, such as SESAM. Although the subspace for potential pre-coding vectors may not be identical to subspaces the channel matrices have been projected into, the singular value decomposition can be solved by an eigenvalue decomposition of lower dimensional matrices. Embodiments therewith provide the advantage that the signal processing algorithms utilized have reduced complexity as for example the search for pre-coding vectors being narrowed to lower dimensional subspaces. Moreover, the amount of channel coefficients, which have to be estimated at or fed back to a transmitter can be reduced in embodiments, while giving full knowledge of the corresponding subspaces at the transmitters and receivers.

In the following a detailed embodiment will be described. The basic concept of some embodiments is to perform signal processing algorithms in predefined reduced subspaces. For this purpose for each user k a $R_k$-dimensional subspace $S_k$ is defined according to certain criteria, which will be explained in the following. Each subspace $S_k$ is spanned by $R_k \leq \text{rank}(H_k) \leq \min(M_{Tx}, M_{Rx,k})$ vectors $t_{k,i} \in \mathbb{C}^{M_{Tx}}$, i.e.

$$S_k = \text{span}\{t_{k,1}, \ldots, t_{k,R_k}\}.$$

The vectors $t_{k,l}$ are normalized, i.e. $\|t_{k,l}\|_2^2 = 1$. The users' channels $H_k$ are then projected into the corresponding subspaces (For simplicity reasons the carrier index is omitted here. In OFDM systems the channel matrices on each carrier are projected into the corresponding sub spaces.)

$$H_{k,proj} = H_k [t_{k,1} \ldots t_{k,R_k}] \begin{bmatrix} t_{k,1}^H \\ \vdots \\ t_{k,R_k}^H \end{bmatrix} = H_k T_k T_k^H. \quad (1.2)$$

Instead of the instantaneous channel realizations $H_k$ the projected channels $H_{k,proj}$ are used as channel state information during running signal processing algorithms.

With the projection into subspaces the instantaneous channel state information at the transmitter can be reduced. In TDD systems that implies that less channel coefficients need to be estimated in the uplink, hence less pilot signals are necessitated. In FDD systems that ensues a lower amount of feedback bits necessitated for transmitting the channel coefficients from the receivers to a transmitter.

Algorithms such as BD as described by Q. H. Spencer, A. L. Swindlehurst, and M. Haardt, Zero-forcing Methods for Downlink Spatial Multiplexing in Multiuser MIMO Channels, *IEEE Trans. on Signal Processing*, 52:461-471, 2004 or OFDMA as described by K. Seong, M. Mohseni, and J. M. Cioffi, Optimal Resource Allocation for OFDMA Downlink Systems, In *Proc. of International Symposium of Information theory (ISIT)*, 2006 necessitate the knowledge of the channel matrices $H_k$ at the transmitter to compute the singular values and right singular vectors of these matrices or projected versions of it. The left singular vectors are not of interest in these algorithms. Hence, the parameters needed can also be obtained from the matrices $H_k^H H_k$.

Correspondingly, when working in reduced subspaces the knowledge of the matrices $$H_{k,proj}^H H_{k,proj} = T_k T_k^H H_k^H H_k T_k T_k^H$$

is necessitated at the transmitter. When the subspaces $S_k$ and therefore the matrices $T_k$ are known at the transmitter and the corresponding receivers, it is sufficient to make knowledge about the matrices $$H_{k,red} = T_k^H H_k^H H_k T_k$$

available at the transmitter. $H_{k,red}$ are $R_k \times R_k$ Hermitian matrices which implies $$\frac{R_k}{2}(R_k + 1)$$

unknown channel coefficients per user. Compared to min $(M_{Tx}M_{Rx,k}, (M_{Tx}+1)M_{Tx}/2)$ coefficients necessitated for full channel state information, $H_k^H H_k$ are $M_{Tx} \times M_{Tx}$ Hermitian matrices, hence they can be fully described by $(M_{Tx}+1)M_{Tx}/2$ coefficients. The fact that only these matrices are necessitated at the transmitter therefore only leads to a reduction of channel coefficients, if $(M_{Tx}+1)/2 < M_{Rx,k}$, this constitutes a huge reduction, when the transmission of subspace vectors is not taken into account.

For SESAM, P. Tejera, W. Utschick, G. Bauch, and J. A. Nossek, Subchannel Allocation in Multiuser Multiple Input Multiple Output Systems, *IEEE Transactions on Information Theory*, 52:4721-4733, October 2006, the same amount of channel coefficients known at the transmitter is needed when matched filters are applied at the receivers. Regarding the determination of transmit vectors the same rationale as above holds. Considering the Dirty Paper Coding part, the interference that needs to be pre-subtracted when encoding user $\pi(i)$ at the transmitter depends only on terms $$u_{\pi(i)}^H H_{\pi(i)} v_{\pi(j)} = v_{\pi(i)}^H H_{\pi(i)}^H H_{\pi(i)} v_{\pi(j)}, j \leq i,$$

wherein $u_{\pi(i)} = H_{\pi(i)} v_{\pi(i)}$ denotes the matched filter at the receiver $\pi(i)$. In this case the interference only depends on the Hermitian forms $H_k^H H_k$, hence the scheme of reduced channel state information presented above can be applied. Note that in worst case the knowledge of the matrices $H_k T_k \in \mathbb{C}^{M_{Rx,k} \times R_k}$ is sufficient, which still constitutes a reduction by the factor $R_k/M_{Tx}$ in channel coefficients.

The performance strongly depends on the choice of the subspaces, i.e. the choice of the vectors $t_{k,l}$. In order to keep the errors caused by the projections as low as possible it is desired to keep as much as possible of the channel's energy in the subspace $S_k$. That is because with the approach shown above one only has full control of the signal processing in the subspace $S_k$, whereas in the subspace orthogonal to $S_k$, denoted as $S_k^\perp$, no optimizations can be conducted. That implies for example that interference cancellation can only be achieved in $S_k$, whereas this is not possible in $S_k^\perp$. However, if the channel energy in $S_k^\perp$ is low compared to the channel energy in $S_k$, the effect of this interference will be less harmful at the receiver. The channel energy is measured by the squared Frobenius norm, cf. e.g. Z. Shen, R. Chen, J. G. Andrews, R. W. Heath, and B. L. Evans, Low Complexity User Selection Algorithms for Multiuser MIMO Systems with Block Diagonalization, *IEEE Transactions on Signal Processing*, 54:3658-3663, 2006, of the channel matrix $H_k$, which is equal to the sum of the squared singular values of $H_k$ i.e.

$$\|H_k\|_F^2 = tr(H_k^H H_k) = \sum_i \sigma_{k,i}^2.$$

In the following a differentiation will be made between subspaces that are chosen based on the average channel energy $E[\|H_k\|_F^2]$ and subspaces that are chosen based on the instantaneous channel energy $\|H_k\|_F^2$. The first option has the advantage that the average channel characteristics change slowlier over time than the instantaneous channel realizations. That implies that the subspaces can be kept constant over many instantaneous channel realizations, whereas with the latter option the subspaces usually change with every channel realization. That implies higher effort for estimation or feedback and computation of subspaces but leads to better performance.

Here it is assumed that the number of dimensions $R_k$ is given. It usually depends on many factors, such as the number of allowed feedback bits and the computational resources available at the transmitter. In order to keep most of the channel's average energy in the $R_k$-dimensional subspace $S_k$ the following optimization problem needs to be solved for all users k:

$$\min_{T_k} E\left[\|H_k\|_F^2 - \|H_k T_k T_k^H\|_F^2\right] = \min_{T_k}(tr(R_k - R_k T_k T_k^H)) \quad (1.3)$$

$$\text{s.t. } t_{k,l}^H t_{k,l} = 1, \forall l = 1, \ldots, R_k, rank(T_k) = R_k$$

wherein $R_k = E[H_k^H H_k]$ denotes the transmit covariance matrix for user k. For random vectors x with $E[xx^H] = R_{xx}$. Problem (1.3) corresponds to minimizing the mean square error of the vector x and its low rank approximation $T_k T_k^H x$. The solution is given by $T_k$ containing the $R_k$ strongest eigenvectors of $R_{xx}$ as described by L. L. Scharf, *Statistical Signal Processing*, Addison-Wesley, 1990.

This truncated Karhunen-Loeve transformation is used in P. M. Castro, M. Joham, L. Castedo, and W. Utschick, Robust Precoding for Multiuser MISO Systems with Limited Feedback Channels, In *Proc. of ITG/IEEE Workshop on Smart Antennas*, 2007 to reduce the feedback in Multiple-Input Single-Output (MISO) systems and in M. Stege, P. Zimmermann, and G. Fettweis, MIMO Channel Estimation with Dimension Reduction, In *Proc. of Int. Symposium on Wireless Personal Multimedia Communications*, 2002, the same idea is applied to improve channel estimation in MIMO systems, whereas the channel matrix is transformed to a vector first. Concerning Problem (1.3) it can be shown that the optimum choice for $T_k$ is given by $$T_{k,opt} = [q_{k,1} \cdots q_{k,R_k}] \quad (1.4)$$

The $q_{k,i}$ denote the eigenvectors of $R_k$ corresponding to the $R_k$ strongest eigenvectors, i.e.

$$R_k = \sum_i \lambda_{k,i} q_{k,i} q_{k,i}^H, \lambda_{k,i} \geq \lambda_{k,2} \geq \ldots \geq \lambda_{k,R_k} \geq \ldots \geq \lambda_{k,M_{Tx}} \geq 0. \quad (1.5)$$

From (1.5) a further possibility to reduce the dimension of the subspace can be deduced. If for some $i \leq R_k, \lambda_{k,i}$ is very small, the corresponding dimension can be dropped without big performance losses.

Similarly to Problem (1.3) the following optimization problem needs to be solved, when instantaneous channel energy is considered:

$$\min_{T_k}(\|H_k\|_F^2 - \|H_k T_k T_k^H\|_F^2)$$
$$\text{s.t. } t_{k,l}^H t_{k,l} = 1, \forall l = 1, \ldots, R_k, \text{rank}(T_k) = R_k$$

The solution to this problem is given by the right singular vectors belonging to the $R_k$ strongest singular values of $H_k$, i.e.

$$T_{k,opt} = [v_{k,1}, \ldots, v_{k,R_k}],$$

whereas $$H_k = \sum_i \sigma_{k,i} u_{k,i} v_{k,i}^H, \sigma_{k,1} \geq \sigma_{k,2} \geq \ldots \geq \sigma_{k,R_k} \geq \ldots \geq \sigma_{k,M_{Rx,k}} \geq 0$$

consequently $$H_{k,proj} = \sum_{i=1}^{R_k} \sigma_{k,i} u_{k,i} v_{k,i}^H. \quad (1.6)$$

As in the previous section, from (1.6) it is obvious that $R_k$ can be further reduced, if the last singular values $\sigma_{k,i}$ are very small. Note that with this choice of subspaces the matrices $H_{k,red}$ become diagonal now, wherein the diagonal entries are the squared singular values $\sigma_{k,i}^2$. Nevertheless now the estimation or feedback of the vectors $v_{k,i}$ is needed with every new channel realization. Furthermore in FDD systems the Singular Value Decompositions (SVDs) have to be computed at the receiver, i.e. the computational burden of computing the SVDs is shifted from the transmitter to the receivers.

Computing the SVDs at the receivers has already been proposed in J-L. Pan, R. L. Olesen, and Y. Tsai, Method and Apparatus for Generating Feedback Information for Transmit Power Control in a Multiple-Input Multiple-Output Wireless Communication System, Technical report, International Patent Nr. PCT/US/2006/019895, 2006 and M. A. Maddah-Ali, M. A. Sadrabadi, and A. K. Khandani, An Efficient Signaling Scheme for MIMO Broadcast Systems: Design and Performance Evaluation, submitted to *IEEE Trans. on Information Theory*, June 2005.

In J-L. Pan, R. L. Olesen, and Y. Tsai, Method and Apparatus for Generating Feedback Information for Transmit Power Control in a Multiple-Input Multiple-Output Wireless Communication System, Technical report, International Patent Nr. PCT/US/2006/019895, 2006, the singular values or power levels, but no singular vectors, are fed back to the transmitter after the SVD. In M. A. Maddah-Ali, M. A. Sadrabadi, and A. K. Khandani, An Efficient Signaling Scheme for MIMO Broadcast Systems: Design and Performance Evaluation, submitted to *IEEE Trans, on Information Theory*, June 2005 transmit beamformers are determined iteratively in a multiuser MIMO system, whereas in each of the $M_{Tx}$ iterations the receivers have to compute one SVD and one normalized vector of size $M_{Tx}$ and a complex number needs to be sent from the transmitter to each receiver and vice versa.

In order to attenuate the drawbacks of increased amount of feedback and the computational burdens of the SVDs at the receivers in OFDM systems there is the possibility of dividing the spectrum into groups of adjacent sub carriers, so called chunks. Signal processing algorithms are only run on one sub carrier per chunk and the resulting transmit vectors are then applied to all sub carriers of the chunk, which may lead to severe performance losses with SESAM due to imperfect channel knowledge used for Dirty Paper Coding. In order to avoid this problem it is therefore proposed to apply the same subspaces on all carriers of one chunk and make known the matrices $H_{k,red}$ for each carrier at the transmitter. In this case the determination of subspace basis vectors is only needed once per chunk.

Besides the effect of reduced feedback another advantage of the proposed method constitutes the reduced computational complexity at the transmitter. As already mentioned, the right singular vectors of the matrices $H_{k,proj}$ can be obtained via an eigenvalue decomposition of $H_{k,proj}^H H_{k,proj}$, which can be written as $$H_{k,proj}^H H_{k,proj} = [Q_k \tilde{Q}_k]\begin{bmatrix} \Lambda_k & 0 \\ 0 & 0 \end{bmatrix}\begin{bmatrix} Q_k^H \\ \tilde{Q}_k^H \end{bmatrix} = Q_k \Lambda_k Q_k^H, \quad (1.7)$$

wherein $\Lambda_k \in \mathbb{C}^{R_k \times R_k}$ is a diagonal matrix containing the nonzero eigenvalues and $Q_k \in \mathbb{C}^{M_{Tx} \times R_k}$ and $\tilde{Q}_k \in \mathbb{C}^{M_{Tx} \times M_{Tx} - R_k}$ are orthonormal matrices. As the $H_{k,proj}$ completely lie in $S_k$, all eigenvectors corresponding to the nonzero eigenvalues also have to lie in $S_k$. Consequently $Q_k$ lies in $S_k$ and $\tilde{Q}_k$ lies in $S_k^\perp$. Therefore it can be written as $$Q_k = T_k \hat{Q}_k \quad (1.8)$$

with $\hat{Q}_k \in \mathbb{C}^{R_k \times R_k}$. All subspaces introduced in the previous section imply that $T_k$ is orthonormal. As $Q_k$ is also orthonormal, $\hat{Q}_k$ has to show the same property. Hence $\hat{Q}_k$ can be obtained from an eigenvalue decomposition of $T_k^H H_{k,proj}^H H_{k,proj} T_k$ as $$T_k^H H_{k,proj}^H H_{k,proj} T_k = T_k^H T_k \hat{Q}_k \Lambda_k \hat{Q}_k^H T_k^H T_k = \hat{Q}_k \Lambda_k \hat{Q}_k^H \quad (1.9)$$

Thus the eigenvalue decomposition of $H_{k,proj}^H H_{k,proj}$ can be solved by an eigenvalue decomposition of $T_k^H H_k^H H_k T_k$ and the matrix-matrix multiplication $T_k \hat{Q}_k$. Instead of computing all eigenvectors or, as in case of SESAM, only the strongest eigenvector of an $M_{Tx} \times M_{Tx}$ matrix, this computationally expensive operation has to be done with a $R_k \times R_k$ matrix now. This is especially attractive, when $R_k = 2$, as in 2 dimensions eigenvectors and eigenvalues can be computed with explicit formulas.

So far complexity of signal processing algorithms can only be reduced, if the SVD of the channel matrices is necessitated. In SESAM for example this is only the case during computing the precoding vector in the first spatial dimension. However similar reductions can also be achieved when singular vectors and singular values of projected channel matrices are necessitated. For that purpose the optimization problem leading to the strongest right singular value $\sigma_{k,i,1}$ of the projected channel matrices $$H_k\left(I - \sum_{j=1}^{i-j} v_i v_i^H\right)$$

is considered:

$$\sigma_{k,i,1}^2 = \max_z z^H P_i H_k^H H_k P_i z \quad (1.10)$$

$$\text{s.t.} \quad z^H z = 1,$$

wherein $$P_i = \left(I - \sum_{j=1}^{i-1} v_j v_j^H\right)$$

denotes the projection matrix in dimension i. Using the channel state information from (1.2) instead of $H_k$, (1.10) reads as:

$$\hat{\sigma}_{k,i,1}^2 = \max_z z^H P_i H_{k,proj}^H H_{k,proj} P_i z \quad (1.11)$$

$$\text{s.t.} \quad z^H z = 1.$$

According to matrix theory Gene H. Golub and Charles F. van Loan, *Matrix Computations*, The John Hopkins University Press, 1989, z has to lie in the range of $(P_i H_{k,proj}^H)$. By using $$H_{k,proj} P_i = H_k T_k T_k^H P_i = \sum_{l=1}^{R_k} (H_k t_{k,l})(P_i t_{k,l})^H$$

it can be readily seen that $$\text{range}(P_i H_{k,proj}^H) = \text{span}\{P_i t_{k,1}, \ldots, P_i t_{k,R_k}\}.$$

Therefore z can be written as a linear combination of these vectors, i.e.

$$z = [P_i t_{k,1} \ldots P_i t_{k,R_k}] x = P_i T_k x \quad (1.12)$$

wherein $x \in \mathbb{C}^{R_k}$. By substituting (1.12) in (1.11), one obtains $$\hat{\sigma}_{k,i,1}^2 = \max_x x^H T_k^H P_i T_k T_k^H H_k^H H_k T_k T_k^H P_i T_k x \quad (1.13)$$

$$\text{s.t.} \quad x^H T_k^H P_i T_k x = 1$$

wherein the idempotence of $P_i$ has already been considered. (1.13) constitutes a generalized eigenvalue problem and it seems that things have become more complicated. By introducing the matrix $B_{k,i} = T_k^H P_i T_k$ (1.13) reads as:

$$\hat{\sigma}_{k,i,1}^2 = \max_x x^H B_{k,i} T_k^H H_k^H H_k T_k T_k^H P_i T_k x$$

$$\text{s.t.} \quad x^H B_{k,i} x = 1.$$

Applying standard algorithms to solve generalized eigenvector problems Gene H. Golub and Charles F. van Loan, *Matrix Computations*, The John Hopkins University Press, 1989, it can be shown that $\hat{\sigma}_{k,i,1}^2$ is the maximum eigenvalue of the matrix $$C_{k,i} = B_{k,i}^{-1} B_{k,i} T_k^H H_k^H H_k T_k T_k^H P_i T_k = T_k^H H_k^H H_k T_k T_k^H P_i T_k$$

Furthermore the principal eigenvector of $C_{k,i}$ determines the direction of x. Its norm $/x/_2$ has to be computed via the constraint $x^H B_{k,i} x = 1$. As $C_{k,i}$ is a $R_k \times R_k$ matrix, the determination of the principal singular value and the corresponding right singular vector can be solved with less computational effort. Despite the fact that additionally a vector multiplication and a vector normalization is needed to obtain z according to (1.12), compared to an SVD of a $M_{Rx,k} \times M_{Tx}$ matrix necessitated with full channel state information huge computational savings are possible. Besides the SVDs the projections also consume significant parts of the computational resources needed for SESAM, as SESAM with full channel state information necessitates in each spatial dimension a matrix-matrix multiplication to compute the projected channels (c.f. Equation (1.1)).

With the proposed method only the matrices $C_{k,i}$ need to be computed, which is less computationally expensive than (1.1). $C_{k,i}$ can be computed by multiplying the $R_k \times R_k$ matrices $T_k^H H_k^H H_k T_k$ and $T_k^H P_i T_k$ with each other. The first matrix is known from the beginning and the computation of the second matrix necessitates $R_k$ inner vector products $t_{k,i}^H v_i$, one outer vector product of $R_k$ dimensional vectors and subtraction of $R_k \times R_k$ matrices. That is because $$T_k^H P_i T_k = \begin{bmatrix} t_{k,1}^H \\ \vdots \\ t_{k,R_k}^H \end{bmatrix} \left(I_{M_{Tx}} - \sum_{j=1}^{i-1} v_j v_j^H\right) [t_{k,1} \ldots t_{k,R_k}] =$$

$$I_{R_k} - \sum_{j=1}^{i-1} \begin{bmatrix} t_{k,1}^H \\ \vdots \\ t_{k,R_k}^H \end{bmatrix} v_j v_j^H [t_{k,1} \ldots t_{k,R_k}]$$

SESAM necessitates only the principal singular values of the matrices $H_{k,proj} P_i$. However, if further singular values and vectors are necessitated, one can usually not obtain these quantities by diagonalizing $C_{k,i}$. Let the eigenvalue decompositions of $C_{k,i}$ and $P_i H_{k,proj}^H H_{k,proj} P_i$ be given as $$C_{k,i} = \hat{Q}_{k,i} \hat{\Lambda}_{k,i} \hat{Q}_{k,i}^H,$$

$$P_i H_{k,proj}^H H_{k,proj} P_i = [Q_{k,i} \tilde{Q}_{k,i}] \begin{bmatrix} \Lambda_{k,i} & 0 \\ 0 & 0 \end{bmatrix} \begin{bmatrix} Q_{k,i}^H \\ \tilde{Q}_{k,i}^H \end{bmatrix} = Q_{k,i} \Lambda_{k,i} Q_{k,i}^H.$$

Proceeding similarly to (1.12) would imply that $$Q_{k,i} = P_i T_k \hat{Q}_{k,i} D_{i,k},$$

wherein $D_{i,k} \in \mathbb{C}^{R_k \times R_k}$ is a diagonal matrix, which normalizes the columns of $P_i T_k \hat{Q}_{k,i}$. As both $\hat{Q}_{k,i}$ and $Q_{k,i}$ are orthonormal, $P_i T_k$ has at least to be orthogonal, which is generally not the case. But the concept of signal processing in reduced subspaces can also be applied to algorithms, as for example to Block Diagonalization Q. H. Spencer, A. L. Swindlehurst, and M. Haardt, Zero-forcing Methods for DownlinkSpatial Multiplexing in Multiuser MIMO Channels, *IEEE Trans. on Signal Processing*, 52:461-471, 2004, which necessitates all right singular vectors of a matrix of the form $H_{k,proj} P_k$.

Note that in BD $P_k$ corresponds to the matrix projecting the k-th user's channel into the nullspace of the other users' signal spaces. Therefore the index i is replaced by the user index k now. In this case an orthonormal basis of the signal space, which corresponds to the range of $(P_k T_k^H)$, needs to be determined, e.g. with the Gram-Schmidt orthogonalization Gene H. Golub and Charles F. van Loan, *Matrix Computations*, The John Hopkins University Press, 1989. Subsuming the resulting $R_k$ orthonormal basis vectors $\hat{t}_{k,i} \in \mathbb{C}^{M_{Tx}}$ in the matrix $\hat{T}_k \in \mathbb{C}^{M_{Tx} \times R_k}$ the nonzero eigenvalues of $P_k H_{k,proj}{}^H H_{k,proj} P_k$ can be obtained via an eigenvalue decomposition of the $R_k \times R_k$ matrix $$\hat{C}_k = \hat{T}_k{}^H P_k H_{k,proj}{}^H H_{k,proj} P_k \hat{T}_k$$

As in (1.8) the corresponding eigenvectors are computed by multiplying the eigenvectors of the matrix $\hat{C}_k$ with $\hat{T}_k$. The proof is on the lines of (1.9). Hence, also the determination of other eigenvalues and eigenvectors than the principal one can be conducted with lower complexity. However, additional computational effort has to be put into the Gram-Schmidt orthogonalization, which only exhibits a complexity of $O(R_k{}^2 M_{Tx})$, Gram-Schmidt orthogonalization necessitates $(R_k-1)R_k/2$ inner vector products, each consuming $2M_{Tx}-1$ floating point operations (flops floating point operations) as described by Raphael Hunger, Floating Point Operations in Matrix-Vector Calculus, Technical report, Munich University of Technology, 2005, $M_{Tx}(R_k-1)R_k/2$ complex multiplications, $M_{Tx}(R_k-1)R_k/2$ complex additions and $R_k$ normalizations of vectors with length $M_{Tx}$.

In order to demonstrate the performance of the proposed method a scenario with $M_{Tx}=8$ antennas at the access point and 10 users each equipped with $M_{Rx,k}=4$ antennas is employed. The OFDM system consists of 16 sub carriers and the bandwidth is equal to 1.3 MHz, such that the carrier spacing accounts for 81 kHz. In the time domain a Gaussian-Wide-Sense-Stationary-Uncorrelated-Scattering (GWSSUS=Gaussian-Wide-Sense-Stationary-Uncorrelated-Scattering) model is employed, cf. R. B. Ertel, P. Cardieri, K. W. Sowerby, T. S. Rappaport, and J. H. Reed, Overview of Spatial Channel Models for Antenna Array Communication Systems, *IEEE Personal Communications*, 5:10-22, 1998 and references therein. That implies that the channels on each resolvable temporal path are uncorrelated with each other and Gaussian distributed. The channel matrices of each temporal path have been generated as described in M. T. Ivrlac, W. Utschick, and J. A. Nossek, Fading Correlations in Wireless MIMO Systems, *IEEE Journal on Selected Areas in Communications*, 21:819-828, 2003. The delay differences between the different temporal paths have been set equal and an exponential power delay profile has been applied.

The transmit covariance matrices have been computed as in M. T. Ivrlac, W. Utschick, and J. A. Nossek, Fading Correlations in Wireless MIMO Systems, *IEEE Journal on Selected Areas in Communications*, 21:819-828, 2003 from the array steering matrices, whereas for each main Direction of Departure (DoD=Direction of Departure) an exponential power angle profile has been applied. Regarding the receive covariance matrices it is assumed that the receivers are located in a rich scattering environment, i.e. the signals arriving at different receive antennas are mutually uncorrelated. Therefore all receive covariance matrices in the time and frequency domain are scaled identity matrices. Note that the WSSUS assumption implies in an OFDM system that the transmit covariance matrices are identical on all carriers. Thus the subspaces chosen according to (1.4) are equal for all carriers. The maximum channel energy of one user has been drawn from a uniform distribution between 0 and 1.

Figure 2:
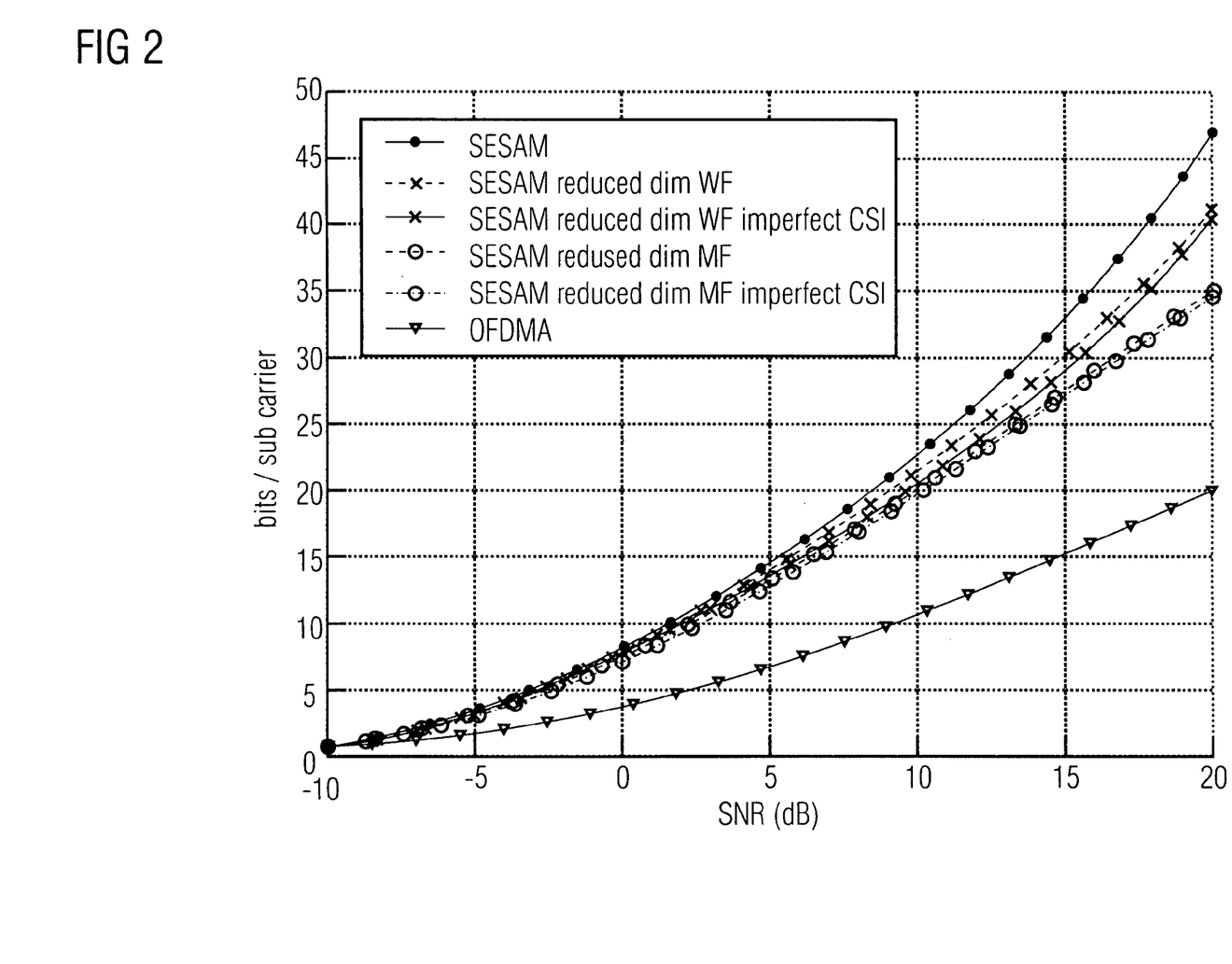
FIG. 2 is a view graph illustrating achievable transmission rates with embodiments and conventional concepts.

FIG. 2 shows a viewgraph of achievable transmission rates versus SNR (SNR=Signal to Noise Ratio) which have been simulated over 10,000 channel realizations in an OFDM system with 16 subcarriers, 8 transmit antennas and 10 users with 4 transmit antennas. Subspaces for reduced dimensions spanned by $R_k=2$ strongest eigenvectors for covariance matrices have been considered. FIG. 2 shows transmission rates for SESAM, SESAM with reduced dimension utilizing a Wiener filter at the receiver, SESAM with reduced dimension, Wiener filter and imperfect CSI. Moreover, FIG. 2 illustrates SESAM with reduced dimension utilizing a matched filter at the receiver, SESAM with reduced dimensions utilizing a matched filter with imperfect CSI and OFDMA (OFDMA=Orthogonal Frequency Division Multiple Access).

FIG. 2 exhibits the transmission rates averaged over 10,000 channel realizations generated as described above. The curve denoted as "SESAM" exhibits the rates achievable with SESAM when perfect channel knowledge is applied. Curves labeled as "SESAM reduced dim" have been obtained with the proposed method, whereas the $R_k=2$ strongest eigenvectors of the transmit covariance matrix have spanned the subspace $S_k$. The dashed lines exhibit the rates achievable when full channel knowledge is applied for Dirty Paper Coding.

For obtaining the solid lines it has been considered that the multiuser interference, which is pre-subtracted with DPC, is computed with the projected channels at the transmitter. That leads to additional noise at the receivers, which constitutes the difference between the actual interference and the interference computed at the transmitter. For comparison the maximum achievable rates with reduced channel state information are included in FIG. 2, too.

Due to the multiuser interference present at the receivers applying matched filters is no longer optimum. Instead the Wiener filter is the optimum and capacity preserving filter at the receivers, hence the corresponding curves are labeled as "SESAM WF". However, it should be noted that the Wiener filter is computationally more expensive than the matched filter and it necessitates explicit knowledge of the matrices $H_k T_k$ at the transmitter for Dirty Paper Coding. When the pilot signals are chosen such that they include information about the encoding order, the signaling concept proposed in P. Tejera, W. Utschick, G. Bauch, and J. A. Nossek, Efficient Implementation of Successive Encoding Schemes for the MIMO OFDM Broadcast Channel, In *IEEE International Conference on Communications*, Istanbul, June 2006, can still be applied with the Wiener filter. From FIG. 2 one can see that despite the fact that the amount of channel coefficients available at the transmitter is reduced from 8×4=32 to 3, still a better performance is possible than with OFDMA with full channel state information.

Figure 3:
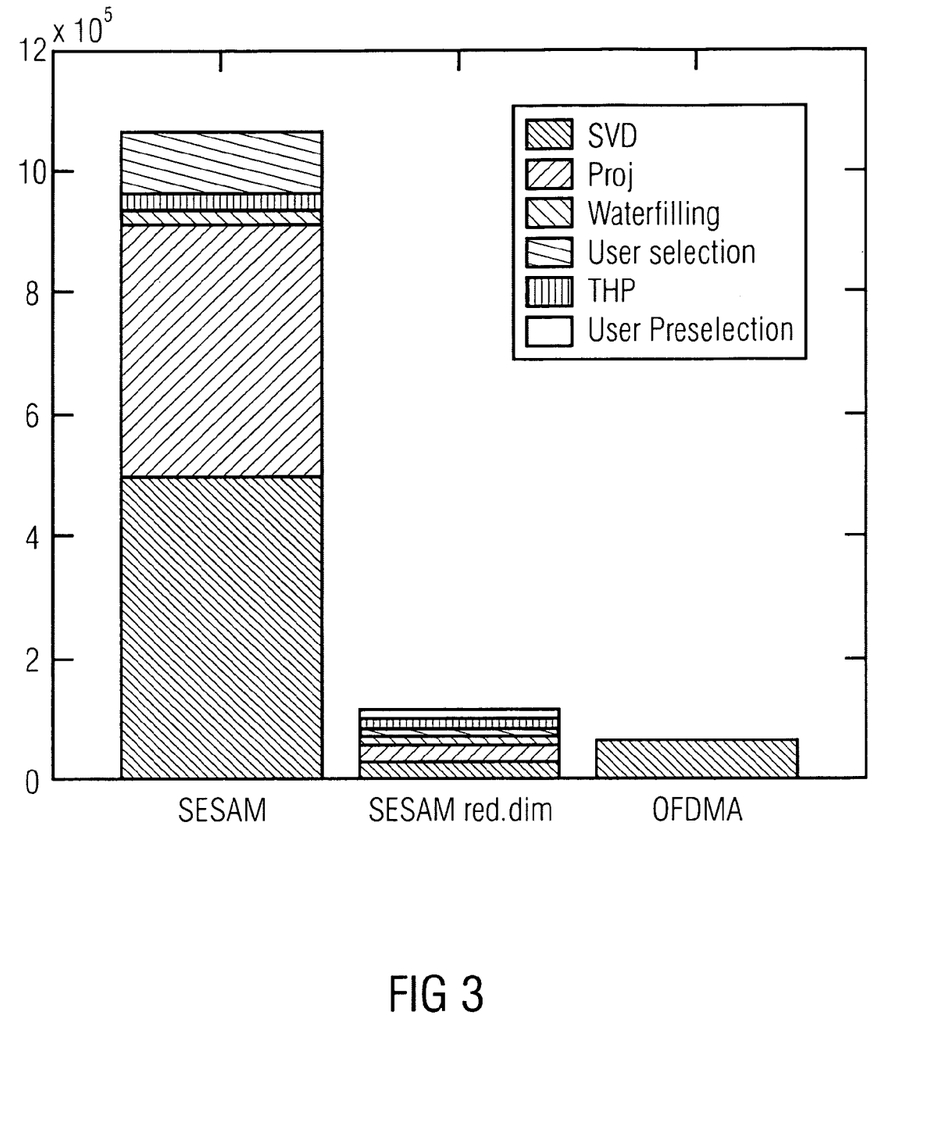
FIG. 3 is a view graph illustrating the computational complexity of embodiments and conventional concepts.

FIG. 3 shows a viewgraph illustrating the computational complexity averaged over 10,000 channel realizations at an SNR level of 20 dB in an OFDM system with 16 subcarriers, 8 transmit antennas and 10 users with 4 receive antennas. Subspaces for reduced dimensions spanned by $R_k=2$ strongest eigenvectors of covariance matrices have been considered.

FIG. 3 exhibits the average number of floating point operations (flops) needed for SESAM with full channel knowledge, SESAM operated in reduced signal spaces and OFDMA at 20 dB. One floating point operation constitutes one complex addition or multiplication. For fairness reasons the complexity of computing the matrices $H_{k,proj}{}^H H_{k,proj}$, which can also be done at the receivers, has been included in the central pillar. As $R_k=2$ and eigenvalue decompositions can be easily conducted in two dimensions, a big decrease in complexity can be observed. Compared to SESAM with full channel state information the average number of flops decreases by 88% and is only a little bit higher than the complexity of OFDMA with full channel state information.

FIG. 4 again shows a viewgraph for achievable transmission rates averaged over 10,000 channel realizations in an OFDM system with 16 subcarriers, 8 transmit antennas and 10 users with 4 receive antennas. Subspaces for reduced dimensions bound by $R_k=2$ strongest right singular vectors of instantaneous channel matrices were considered. In the simulations, the same subspaces on each chunk of size 8 subcarriers were considered.

Figure 4:
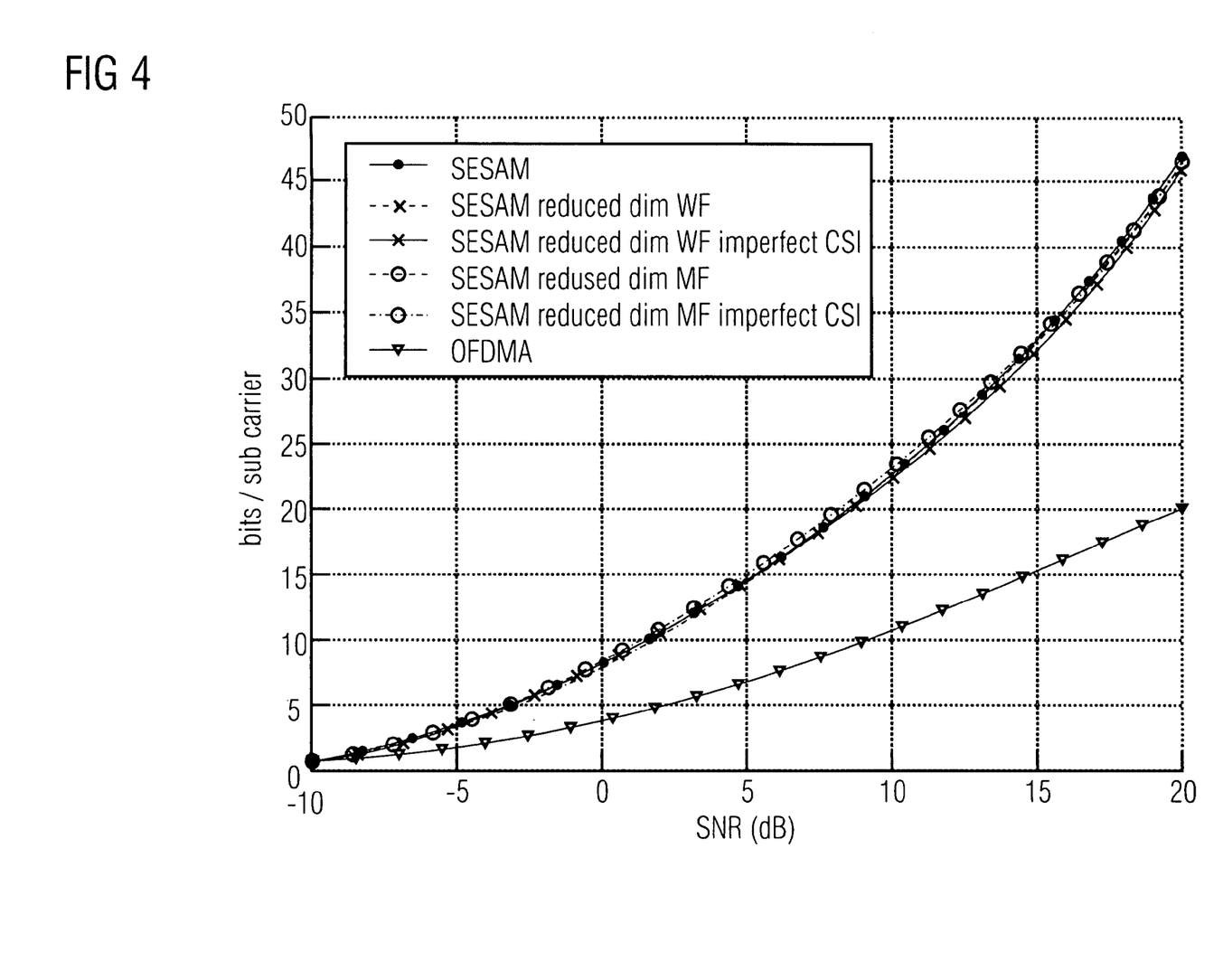
FIG. 4 is another view graph illustrating achievable transmission rates with embodiments and conventional concepts.

Finally FIG. 4 exhibits the achievable transmission rates averaged over 10,000 channel realizations when the subspaces are chosen based on instantaneous channel knowledge. For the determination of subspaces the spectrum has been divided into 2 chunks, whereas in each chunk the two strongest right singular vectors of the channel matrices from the carrier in the middle of the chunk have been chosen to span the subspaces $S_k$. Compared to FIG. 2 the perfect SESAM curve can be approached more closely at the price of higher effort to determine the subspaces and make knowledge about them available at the transmitter.

Embodiments provide the advantage of a significantly reduced computational complexity when utilizing algorithms as SESAM as they are carried out in subspaces having a reduced dimension. Performance losses introduced by not utilizing all subchannels or dimensions of the MIMO radio channel are very low and are therefore acceptable. Moreover, embodiments provide the advantage of decreased amount of channel state information that needs to be fed back from a transmitter in, for example, an FDD system as it only relates to the subspace.

Depending on certain implementation requirements of the inventive methods, the inventive methods can be implemented in hardware or in software. The implementation can be performed using a digital storage medium, in particular a disc, a DVD or CD having electronically readable control signals stored thereon, which cooperate with the programmable computer system, such that the inventive methods are performed. Generally, the present invention is, therefore, a computer program product with a program code stored on a machine-readable carrier, the program code being operative for performing the inventive methods when the computer program product runs on a computer. In other words, the inventive methods are, therefore, a computer program having a program code for performing at least one of the inventive methods when the computer program runs on a computer.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A subchannel allocation apparatus for allocating subchannels of a MIMO radio channel to a plurality of users, the MIMO radio channel comprising a first number of subchannels, a subchannel comprising a transmission capacity, comprising:
   a subspace determiner for determining a subspace of the MIMO radio channel, the subspace comprising a second number of subchannels, the second number being lower than the first number and each subchannel of the second number of subchannels comprising a higher transmission capacity than the subchannel with the lowest transmission capacity of the first number of subchannels; and
   a subchannel allocator responsive to the subspace determiner for allocating a subchannel from the second number of subchannels of the subspace to a user based on an allocation metric.

2. The subchannel allocation apparatus of claim 1, wherein the subspace determiner is adapted for determining the subspace based on an information received from the user.

3. The subchannel allocation apparatus of claim 1, wherein the subspace determiner is adapted for determining the subspace based on a channel estimation information from a user or a channel estimator being comprised in the subchannel allocation apparatus.

4. The subchannel allocation apparatus of claim 1, wherein the subspace determiner is adapted for using an information on a reduced MIMO channel matrix being associated with a channel matrix of the MIMO radio channel for mapping the reduced MIMO channel matrix to the subspace of the MIMO radio channel utilizing a projection matrix, the reduced MIMO channel matrix comprising a lower rank than the associated channel matrix of the MIMO radio channel.

5. The subchannel allocation apparatus of claim 4, wherein the projection matrix is based on eigenvectors of a covariance matrix of the associated channel matrix of the MIMO radio channel, corresponding to eigenvalues, which are higher than the lowest eigenvalue of the covariance matrix of the associated channel matrix of the MIMO radio channel, wherein the transmission capacity of a subchannel corresponds to an average transmission capacity, which can be derived from the respective eigenvalue.

6. The subchannel allocation apparatus of claim 4, wherein the projection matrix is based on singular vectors of the associated channel matrix of the MIMO radio channel corresponding to the singular values, which are higher than the lowest singular value of the associated channel matrix of the MIMO radio channel, wherein the transmission capacity of a subchannel can be derived from the respective singular value.

7. The subchannel allocation apparatus claim 1, wherein the subchannel allocator is adapted for determining singular values of a subspace matrix as allocation metric with corresponding right singular vectors determining the second number of subchannels of the subspace of the MIMO radio channel and for allocating a subchannel to the user corresponding to a higher singular value than the lowest singular value of the subspace matrices of the plurality of users.

8. The subchannel allocation apparatus of claim 7, wherein the subchannel allocator is adapted for determining the singular values of the subspace based on an eigenvalue decomposition of a reduced MIMO channel matrix being associated with a channel matrix of the MIMO radio channel and a projection matrix, the reduced MIMO channel matrix comprising a lower rank than the associated channel matrix of the MIMO radio channel.

9. The subchannel allocation apparatus of claim 8, wherein the rank of the reduced MIMO channel matrix is based on the second number of subchannels in the subspace of the MIMO radio channel.

10. The subchannel allocation apparatus claim 1, wherein the subchannel allocator is adapted for allocating a plurality of subchannels to the plurality of users according to an allocation algorithm based on a SVD, SESAM, BD or OFDMA, based on the subspace of the MIMO radio channel.

11. The subchannel allocation apparatus of claim 10, wherein the subchannel allocator is adapted for determining iteration subspaces of the SESAM algorithm based on reduced iteration MIMO channel matrices comprising a rank being based on a number of allocation subchannels, wherein the number of allocation subchannels is lower than or equal to the second number of subchannels.

12. A transceiver apparatus comprising a subchannel allocation apparatus for allocating subchannels of a MIMO radio channel to a plurality of users, the MIMO radio channel comprising a first number of subchannels, a subchannel comprising a transmission capacity, the subchannel allocation apparatus comprising:
   a subspace determiner for determining a subspace of the MIMO radio channel, the subspace comprising a second number of subchannels, the second number being lower than the first number and each subchannel of the second number of subchannels comprising a higher transmission capacity than the subchannel with the lowest transmission capacity of the first number of subchannels; and
   a subchannel allocator responsive to the subspace determiner for allocating a subchannel from the second number of subchannels of the subspace to a user based on an allocation metric.

13. The transceiver apparatus of claim 12, being adapted for communicating in a FDD or TDD communication system.

14. The transceiver apparatus of claim 12, being adapted for communicating in an OFDM or CDM system.

15. A method for allocating subchannels of a MIMO radio channel to a plurality of users, the MIMO radio channel comprising a first number of subchannels, each subchannel comprising a transmission capacity, comprising
   determining a subspace of the MIMO radio channel, the subspace comprising a second number of subchannels, the second number being lower than the first number and each subchannel of the second number of subchannels comprising a higher transmission capacity than the subchannel with the lowest transmission capacity of the first number of subchannels; and
   allocating a subchannel from the second number of subchannels of the subspace to a user based on an allocation metric in response to determining the subspace.

16. A computer program comprising a program code for performing a method for allocating subchannels of a MIMO radio channel to a plurality of users, the MIMO radio channel comprising a first number of subchannels, each subchannel comprising a transmission capacity, the method comprising:
   determining a subspace of the MIMO radio channel, the subspace comprising a second number of subchannels, the second number being lower than the first number and each subchannel of the second number of subchannels comprising a higher transmission capacity than the subchannel with the lowest transmission capacity of the first number of subchannels; and
   allocating a subchannel from the second number of subchannels of the subspace to a user based on an allocation metric in response to determining the subspace,
when the program code runs on a computer.

17. A transceiver apparatus for communicating in a MIMO radio channel, the MIMO radio channel comprising a first number of subchannels, each subchannel comprising a transmission capacity, comprising:
   a channel estimator for estimating the MIMO radio channel based on pilot symbols provided by a transmitter;
   a channel evaluator for determining the first number of subchannels based on the estimated MIMO radio channels;
   a subspace determiner for determining a subspace of the MIMO radio channel, the subspace comprising a second number of subchannels, the second number being lower than the first number and each subchannel of the second number of subchannels comprising a higher transmission capacity than the subchannel with the lowest transmission capacity of the first number of subchannels; and
   a feedback transmitter for transmitting information on the subspace.

18. The transceiver apparatus of claim 17, wherein the subspace determiner is adapted for determining an information on a reduced MIMO channel matrix being associated with a channel matrix of the MIMO radio channel and a projection matrix for mapping the reduced MIMO channel matrix to the subspace of the MIMO radio channel, the reduced MIMO radio channel matrix comprising a lower rank than the associated channel matrix of the MIMO radio channel.

19. The transceiver apparatus of claim 18, wherein the projection matrix is based on eigenvectors of a covariance matrix of the associated channel matrix of the MIMO radio channel corresponding to eigenvalues, which are higher than the lowest eigenvalue of the covariance matrix of the associated channel matrix of the MIMO radio channel, wherein the transmission capacity of a subchannel corresponds to an average transmission capacity, which can be derived from the respective eigenvalue.

20. The transceiver apparatus of claim 18, wherein the projection matrix is based on singular vectors of the associated channel matrix of the MIMO radio channel corresponding to singular values, which are higher than the lowest singular value of the associated channel matrix of the MIMO radio channel, wherein the transmission capacity of a subchannel can be derived from the respective singular value.

21. The transceiver apparatus of claim 18, wherein the rank of the reduced MIMO channel matrix is based on the second number of subchannels of the subspace of the MIMO radio channel.

22. The transceiver apparatus of claim 21, wherein the second number is a predefined value.

23. The transceiver apparatus of claim 18, wherein the feedback transmitter is adapted for transmitting coefficients of the reduced MIMO channel matrix as information on the subspace.

24. The transceiver apparatus of claim 17, being further adapted for communicating in an FDD or TDD communication system.

25. The transceiver apparatus of claim 17, being further adapted for communicating in an OFDM or CDM system.

26. A method for communicating in a MIMO radio channel, the MIMO radio channel comprising a first number of subchannels, each subchannel comprising a transmission capacity, comprising
   estimating the MIMO radio channel based on pilot symbols provided by a transmitter;
   determining the first number of subchannels based on the estimated MIMO radio channel;
   determining a subspace of the MIMO radio channel, the subspace comprising a second number of subchannels, the second number being lower than the first number and each subchannel of the second number of subchannels comprising a higher transmission capacity than the subchannel with the lowest transmission capacity of the first number of subchannels; and
   transmitting information on the subspace.

27. A computer program comprising a program code for performing a method for communicating in a MIMO radio channel, the MIMO radio channel comprising a first number of subchannels, each subchannel comprising a transmission capacity, the method comprising:
   estimating the MIMO radio channel based on pilot symbols provided by a transmitter;

determining the first number of subchannels based on the estimated MIMO radio channel;

determining a subspace of the MIMO radio channel, the subspace comprising a second number of subchannels, the second number being lower than the first number and each subchannel of the second number of subchannels comprising a higher transmission capacity than the subchannel with the lowest transmission capacity of the first number of subchannels; and transmitting information on the subspace, when the computer program runs on a computer.

* * * * *